United States Patent
Mishima (10) Patent No.: US 10,451,175 B2
(45) Date of Patent: Oct. 22, 2019

(54) OIL JET ARM AND METHOD FOR LUBRICATING CHAIN SPAN EMPLOYING SAID OIL JET ARM, AND CHAIN TENSIONING DEVICE AND METHOD FOR LUBRICATING CHAIN SPAN EMPLOYING SAID CHAIN TENSIONING DEVICE

(71) Applicant: BorgWarner Inc., Auburn Hills, MI (US)

(72) Inventor: Kunihiko Mishima, Mie (JP)

(73) Assignee: BorgWarner, Auburn Hills, MI (US)

( * ) Notice: Subject to any disclaimer, the term of this patent is extended or adjusted under 35 U.S.C. 154(b) by 25 days.

(21) Appl. No.: 15/304,094

(22) PCT Filed: Apr. 17, 2015

(86) PCT No.: PCT/US2015/026339
§ 371 (c)(1),
(2) Date: Oct. 14, 2016

(87) PCT Pub. No.: WO2015/164197
PCT Pub. Date: Oct. 29, 2015

(65) Prior Publication Data
US 2017/0037956 A1    Feb. 9, 2017

(30) Foreign Application Priority Data

Apr. 26, 2014 (JP) .................. 2014-092157

(51) Int. Cl.
*F16H 57/05* (2006.01)
*F01M 1/06* (2006.01)
(Continued)

(52) U.S. Cl.
CPC .............. *F16H 57/05* (2013.01); *F01L 1/022* (2013.01); *F01L 1/46* (2013.01); *F01M 1/06* (2013.01);
(Continued)

(58) Field of Classification Search
CPC ..... F16H 2007/0812; F16H 2007/0859; F16H 2007/0872; F16H 7/0848; F16H 2007/0806
(Continued)

(56) References Cited

U.S. PATENT DOCUMENTS 5,595,549 A   1/1997  Jarrand
5,647,811 A   7/1997  Mott
(Continued)

FOREIGN PATENT DOCUMENTS

CN    102400736 A    4/2012
JP    S60161398 U    10/1985
(Continued)

OTHER PUBLICATIONS

English language abstract and machine-assisted English translation for CN 102400736 extracted from espacenet.com database on Dec. 5, 2016, 9 pages.
(Continued)

*Primary Examiner* — Henry Y Liu
(74) *Attorney, Agent, or Firm* — Howard & Howard Attorneys PLLC (57) ABSTRACT

The problem to be solved by the present invention lies in making it possible to reduce costs and to reduce the size of an oil pump, without impeding the degree of freedom in chain layout. An oil jet 1 is constructed in order to supply lubricating oil to a tension-side span of a chain C while also causing a tensioning force to act on a slack-side span of the chain C. The oil jet arm 1 is provided with a pivoting-side part 2A, and a tip-end side part 2B which is provided in such a way as to be pivotable about the pivoting-side part 2A and is acted on by a pressing force from a piston 41 of a hydraulic tensioner 4, and an oil ejection hole 22a for ejecting to the outside oil supplied from an oil discharge hole
(Continued)

41a in the piston 41 is formed in the tip-end side part 2B. Oil ejected from the oil ejection hole 22a is supplied to a portion E on the meshing start side with a sprocket 100 on the tension-side span of the chain C.

11 Claims, 6 Drawing Sheets

(51) Int. Cl.
| | |
|---|---|
| *F01M 1/08* | (2006.01) |
| *F01M 9/10* | (2006.01) |
| *F16H 7/08* | (2006.01) |
| *F16H 57/04* | (2010.01) |
| *F16H 7/18* | (2006.01) |
| *F01L 1/02* | (2006.01) |
| *F01L 1/46* | (2006.01) |
| *F16H 7/10* | (2006.01) |
| *F02B 67/06* | (2006.01) |

(52) U.S. Cl.
CPC ............... *F01M 1/08* (2013.01); *F01M 9/10* (2013.01); *F16H 7/08* (2013.01); *F16H 7/10* (2013.01); *F16H 7/18* (2013.01); *F16H 57/04* (2013.01); *F16H 57/046* (2013.01); *F16H 57/0456* (2013.01); *F02B 67/06* (2013.01); *F16H 2007/0812* (2013.01); *F16H 2007/0872* (2013.01); *F16H 2007/0891* (2013.01); *F16H 2007/0893* (2013.01)

(58) Field of Classification Search
USPC .................................................. 474/111, 91
See application file for complete search history.

(56) References Cited

U.S. PATENT DOCUMENTS

| | | | |
|---|---|---|---|
| 5,707,309 | A | 1/1998 | Simpson |
| 6,863,042 | B2 | 3/2005 | Oh |
| 2008/0173275 | A1 | 7/2008 | Koyama |
| 2009/0036241 | A1 | 2/2009 | Hirayama et al. |
| 2009/0325748 | A1 | 12/2009 | Pflug et al. |

FOREIGN PATENT DOCUMENTS

| | | |
|---|---|---|
| JP | S62181751 U | 11/1987 |
| JP | S64000755 U | 1/1989 |
| JP | H02011830 A | 1/1990 |
| JP | H08093890 A | 4/1996 |
| JP | H09203445 A | 8/1997 |
| JP | H 09-273408 A | 10/1997 |
| JP | 2001349400 A | 12/2001 |
| JP | 2004-116510 A | 4/2004 |
| KR | 10-2012-0041893 A | 5/2012 |
| WO | 2009053166 A1 | 4/2009 |

OTHER PUBLICATIONS

English language abstract and machine-assisted English translation for JPH 09-273408 extracted from espacenet.com database on Dec. 5, 2016, 10 pages.
English language abstract for JP 2004-116510 extracted from espacenet.com database on Dec. 5, 2016, 2 pages.
English language abstract and machine-assisted English translation for KR 10-2012-0041893 extracted from espacenet.com database on Dec. 5, 2016, 15 pages.
International Search Report for Application No. PCT/US2015/026339 dated Jul. 30, 2015, 2 pages.
Machine-assisted English translation for JPS 60-161398 extracted from the PAJ database on Jan. 31, 2018, 4 pages.
Machine-assisted English translation for JPS 62-181751 extracted from the PAJ database on Jan. 31, 2018, 2 pages.
Machine-assisted English translation for JPS 64-000755 extracted from the PAJ database on Jan. 31, 2018, 2 pages.
English language abstract and machine-assisted English translation for JPH 02-011830 extracted from espacenet.com database on Jan. 31, 2018, 7 pages.
English language abstract and machine-assisted English translation for JPH 08-093890 extracted from espacenet.com database on Jan. 31, 2018, 11 pages.
English language abstract for JPH 09-203445 extracted from espacenet.com database on Jan. 31, 2018, 2 pages.
English language abstract and machine-assisted English translation for JP 2001-349400 extracted from espacenet.com database on Jan. 31, 2018, 14 pages.
English language abstract and machine-assisted English translation for WO 2009/053166 extracted from espacenet.com database on Jan. 31, 2018, 8 pages.

OIL JET ARM AND METHOD FOR LUBRICATING CHAIN SPAN EMPLOYING SAID OIL JET ARM, AND CHAIN TENSIONING DEVICE AND METHOD FOR LUBRICATING CHAIN SPAN EMPLOYING SAID CHAIN TENSIONING DEVICE

TECHNICAL FIELD

The present invention relates to an oil jet arm for supplying lubricating oil to a tension-side span of a chain while causing a tensioning force to act on a slack-side span of the chain.

PRIOR ART

In a timing chain for an automobile engine, chain wear generally tends to progress at the location of the start of meshing between a chain tension-side span and a crankshaft sprocket. For this reason, devices for supplying lubricating oil to the chain tension-side span have been proposed in the prior art.

For example, the device described in JP 2004-116510 A comprises a protrusion 16 which protrudes forward from a front surface of a cylinder block, oil supplied from an internal main oil capillary is introduced to the protrusion 16, and the oil that has been introduced is jetted to the location of meshing between a timing chain 10 and a crankshaft sprocket 12 from a jetting hole 18 at the tip end of the protrusion 16, as described in paragraph [0002] and FIG. 1 of the specification of that document.

SUMMARY OF THE INVENTION

Problem to be Solved by the Invention

However, the following drawbacks are encountered with the device described in the abovementioned publication.

(i) In addition to the fact that it is necessary to provide the protrusion 16 on the cylinder block front surface, it is also necessary to provide a bore in order to form the jetting hole 18 for oil ejection at the tip end of the protrusion 16, so this increases the cost. Furthermore, a structure also exists in which a female thread is machined at the tip end of a protrusion and an oil-ejection nozzle is separately provided in a threaded hole, and in this case not only is it necessary to machine a female thread in addition to forming a pilot hole, the number of components also increases and there are more assembly steps, so the cost increases further.

(ii) The protrusion 16 projects in a region between a slack-side span (the span on the side on which a tensioner arm is disposed) and the tension-side span (the span on the side on which a guide arm is disposed) of the timing chain 10, and the position of the protrusion 16 is at the narrowest point of the gap between the slack-side span and the tension-side span of the timing chain 10, so it is necessary to design the chain layout while taking account of the maximum amount of slackness of the slack-side span, and this impedes the degree of freedom in layout design. If the maximum amount of slackness of the chain slack-side span is not considered to be adequate, there is a risk of damaging the chain as a result of the slack-side span striking the protrusion 16 during operation.

(iii) Not only does oil have to be supplied from an oil pump to a hydraulic tensioner, oil must also be supplied to the protrusion 16, so the oil pump becomes larger in size.

The present invention has been devised in view of the conventional situation described above, and the problem to be solved by the present invention lies in making it possible to reduce costs and to reduce the size of the oil pump, without impeding the degree of freedom in chain layout.

Means for Solving the Problem

In order to solve the abovementioned problem, the present invention provides an oil jet arm for supplying lubricating oil to a tension-side span of a chain while causing a tensioning force to act on a slack-side span of the chain, said oil jet arm being provided with a pivoting-side part, and a tip-end side part which is provided in such a way as to be pivotable about the pivoting-side part and is acted on by a pressing force from a piston of a hydraulic tensioner, and said oil jet arm comprises an oil ejection hole for ejecting to the outside oil introduced from the piston or from the pivoting-side part (see claim 1).

According to the present invention, an oil ejection hole is provided in an oil jet arm which functions as a tensioner arm, and oil introduced from a piston of a hydraulic tensioner or the pivoting-side part is ejected to the outside from the oil ejection hole, whereby lubricating oil is supplied to the chain tension-side span.

In this case, it is no longer necessary to provide a separate member on the cylinder block side in order to eject oil toward the chain tension-side span and it is no longer necessary to provide a hole in the member or to machine a female thread, so the cost can be reduced. In addition, there is no need for a separate member to be provided protruding into a region between the chain slack-side span and tension-side span, so there is no impediment in terms of the degree of freedom of chain layout design. Furthermore, when oil is introduced from the piston of the hydraulic tensioner, it is only oil supplied from the oil pump to the hydraulic tensioner which is utilized, so the size of the oil pump can be reduced.

According to the present invention, the oil which is ejected from the oil ejection hole is supplied to a portion on the meshing start side with a sprocket on the chain tension-side span (see claim 2). The portion on the meshing start side is the location at which wear and deterioration of the chain and the sprocket are most likely to progress, so by supplying oil to that portion it is possible to efficiently prevent progression of wear and deterioration of the chain and sprocket.

According to the present invention, the oil ejection hole is provided in the tip-end side part or in the pivoting-side part (see claim 3). In this case, oil introduced from the piston of the hydraulic tensioner or the pivoting-side part is supplied to the chain tension-side span from the tip-end side part of the oil jet arm or from the oil ejection hole in the pivoting-side part.

According to the present invention, the oil ejection hole is provided in the pivoting-side part of the oil jet arm, and an oil path for feeding, to the pivoting-side part, oil introduced from the piston to the tip-end side part of the oil jet arm is formed (see claim 4). In this case, oil introduced from the piston of the hydraulic tensioner is fed to the pivoting-side part through the oil path from the tip-end side part of the oil jet arm and is supplied to the chain tension-side span from the oil ejection hole in the pivoting-side part.

A method for lubricating a chain span according to the present invention employs the oil jet arm as claimed in claim 1 (see claim 5), and oil introduced from the piston of the hydraulic tensioner or the pivoting-side part of the oil jet arm is ejected to the outside from the oil ejection hole in the oil jet arm and supplied to the chain tension-side span, whereby the chain span is lubricated.

A chain tensioning device according to the present invention is provided with: a tensioner arm which is disposed on a chain slack-side span; and a hydraulic tensioner comprising a piston for causing a pressing force to act on the tensioner arm. An oil discharge hole for discharging to the outside oil supplied to the hydraulic tensioner is formed at the tip end of the piston of the hydraulic tensioner. An oil ejection hole for ejecting oil discharged from the oil discharge hole of the piston toward a chain tension-side span is formed in the tensioner arm (see claim 6).

According to the present invention, the oil ejection hole is provided in the tensioner arm and oil discharged from the oil discharge hole at the tip end of the piston of the hydraulic tensioner is ejected from the oil ejection hole toward the chain tension-side span, whereby lubricating oil is supplied to the chain tension-side span.

In this case, it is no longer necessary to provide a separate member on the cylinder block side in order to eject oil toward the chain tension-side span and it is no longer necessary to provide a hole in the member or to machine a female thread, so the cost can be reduced. Furthermore, there is no need for a separate member to be provided protruding into a region between the chain slack-side span and tension-side span, so there is no impediment in terms of the degree of freedom of chain layout design. In addition, when oil is ejected, it is only oil supplied from the oil pump to the hydraulic tensioner which is utilized, so the size of the oil pump can be reduced.

According to the present invention, the oil ejected from the oil ejection hole is supplied to a portion on the meshing start side with a sprocket on the chain tension-side span (see claim 7). The portion on the meshing start side is the location at which wear and deterioration of the chain and the sprocket are most likely to progress, so by supplying oil to that portion, it is possible to efficiently prevent progression of wear and deterioration of the chain and sprocket.

According to the present invention, the tensioner arm comprises a pivoting-side part and a tip-end side part which is pivotable about the pivoting-side part, and the oil ejection hole is provided in the tip-end side part (see claim 8). In this case, oil introduced from the piston of the hydraulic tensioner is supplied to the chain tension-side span from the oil ejection hole in the tip-end side part of the tensioner arm.

According to the present invention, the tensioner arm comprises a pivoting-side part and a tip-end side part which is pivotable about the pivoting-side part, the oil ejection hole is provided in the pivoting-side part, and an oil path for feeding, to the pivoting-side part, oil introduced from the oil discharge hole in the piston to the tip-end side part is formed (see claim 9). In this case, oil introduced from the piston of the hydraulic tensioner is fed to the pivoting-side part through the oil path from the tip-end side part of the tensioner arm and is supplied to the chain tension-side span from the oil ejection hole in the pivoting-side part.

A method for lubricating a chain span according to the present invention employs the chain tensioning device as claimed in claim 6 (see claim 10) and oil discharged from the oil discharge hole at the tip end of the piston of the hydraulic tensioner is ejected to the outside from the oil ejection hole in the tensioner arm and supplied to the chain tension-side span, whereby the chain span is lubricated.

Advantage of the Invention

According to the present invention as described above, an oil ejection hole is provided in an oil jet arm (tensioner arm) and oil introduced from a piston of a hydraulic tensioner or a pivoting-side part of the oil jet arm is ejected to the outside from said oil ejection hole, and lubricating oil is supplied to a chain tension-side span as a result. In this case, it is no longer necessary to provide a separate member on the cylinder block side in order to eject oil toward the chain tension-side span and it is no longer necessary to provide a hole in the member or to machine a female thread, so the cost can be reduced. Furthermore, there is no need for a separate member to be provided protruding into a region between the chain slack-side span and tension-side span, so there is no impediment in terms of the degree of freedom of chain layout design. In addition, when oil is introduced from the piston of the hydraulic tensioner, it is only oil supplied from the oil pump to the hydraulic tensioner which is utilized, so the size of the oil pump can be reduced.

MODE OF EMBODIMENT OF THE INVENTION

Exemplary embodiments of the present invention will be described below with reference to the appended figures.

First Exemplary Embodiment

FIG. 1-7 are diagrams to illustrate an oil jet arm according to a first exemplary embodiment of the present invention.

Figure 1:
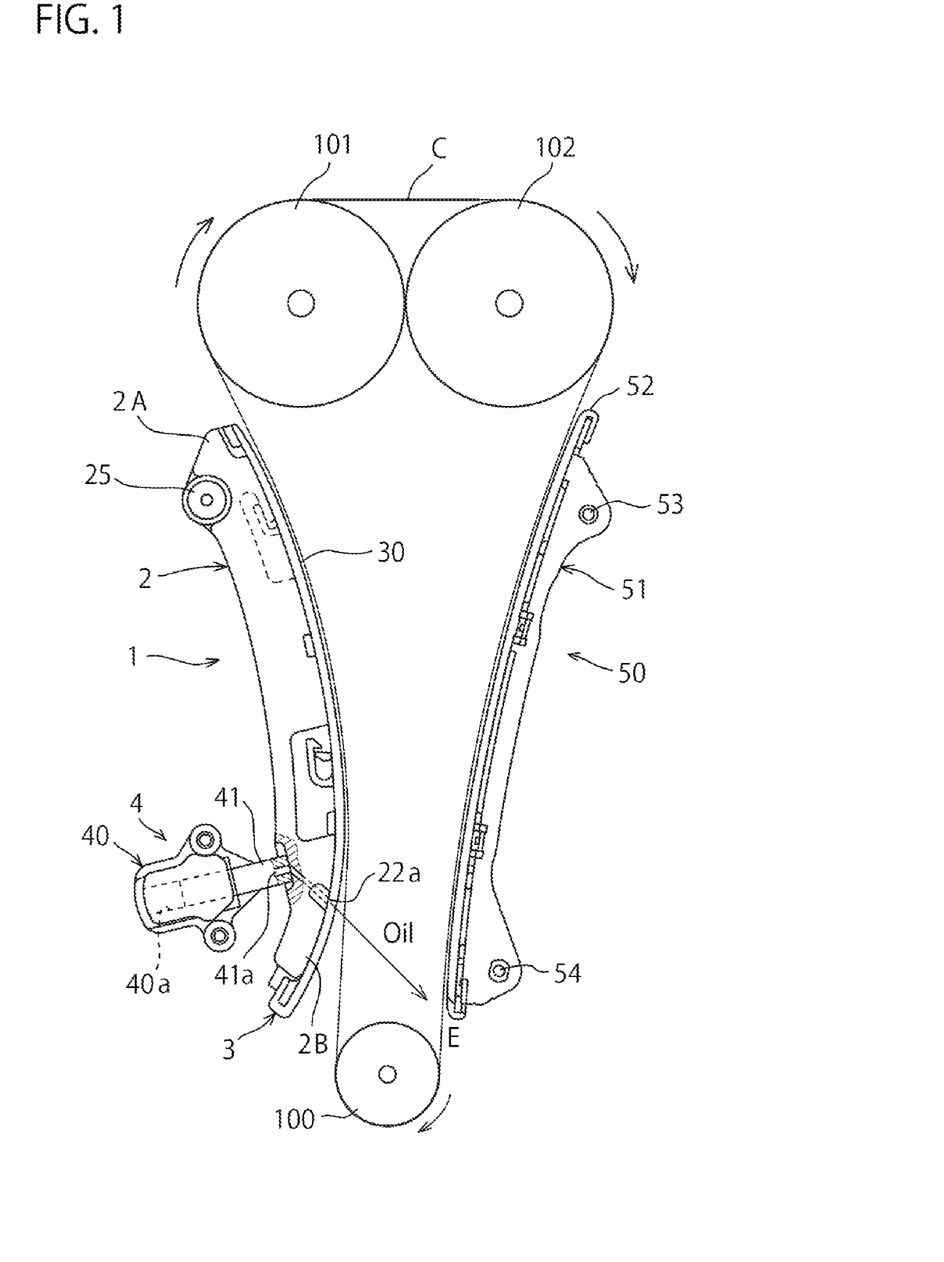
FIG. 1 is a schematic structural diagram of a timing chain system provided with an oil jet arm according to a first exemplary embodiment of the present invention.

As shown in FIG. 1, an engine timing system (chain tensioning device) employing an oil jet arm according to this exemplary embodiment comprises a timing chain C which is wound around a crank sprocket 100 and cam sprockets 101, 102. In the figure, the arc-shaped arrows indicate the direction of rotation of the chain C. An oil jet arm 1 for causing an appropriate tensioning force to act on the chain C while removing slackness in the chain C is disposed on the slack-side span of the chain C, and a chain guide 50 for guiding travel of the chain C is disposed on the tension-side span.

The oil jet arm 1 comprises an arm main body 2 and a shoe 3 which is detachably fitted thereto (see FIG. 2-4), and the chain guide 50 likewise comprises a guide main body 51 and a shoe 52 which is detachably fitted thereto. The arm main body 2 and the guide main body 51 comprise a metal member, for example, while the shoes 3, 52 comprise a resin member, for example. Furthermore, the arm main body 2 comprises a pivoting-side part 2A which is pivotably supported by way of a pivot member 25 on the cylinder block side of the engine, and a tip-end side part 2B which is provided in such a way as to be pivotable about the pivoting-side part 2A. The guide main body 51 is fixed to the cylinder block side by way of fixing members 53, 54.

A hydraulic tensioner 4 is provided on the tip-end side part 2B of the main body 2. The hydraulic tensioner 4 comprises a housing 40 and a piston 41 which is provided in such a way as to be slidable in a piston hole inside the housing 40 while also abutting the tip-end side part 2B of the arm main body 2. During operation, hydraulic pressure from an oil pump (not depicted) is supplied to a chamber 40a inside the housing 40 and a pressing force from the piston 41 acts on the slack-side span of the chain C by way of the tip-end side part 2B of the arm main body 2.

An axial hole (oil discharge hole) 41a for discharging to the outside oil supplied into the chamber 40a is formed running through the piston 41. The oil discharge hole 41a serves to adjust the tensioner rigidity with respect to the chain C by allowing leakage of oil from said oil discharge hole 41a during operation.

Figure 2:
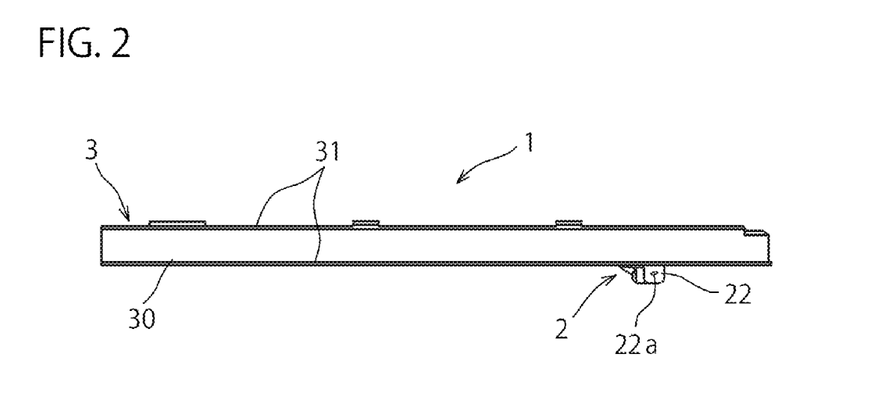
FIG. 2 is a schematic plan view of the oil jet arm (FIG. 1).
Figure 3:
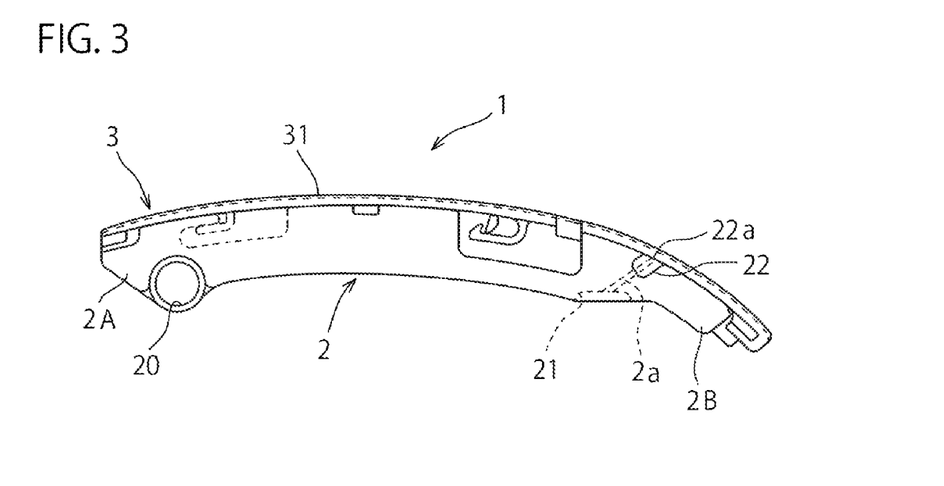
Figure 4:
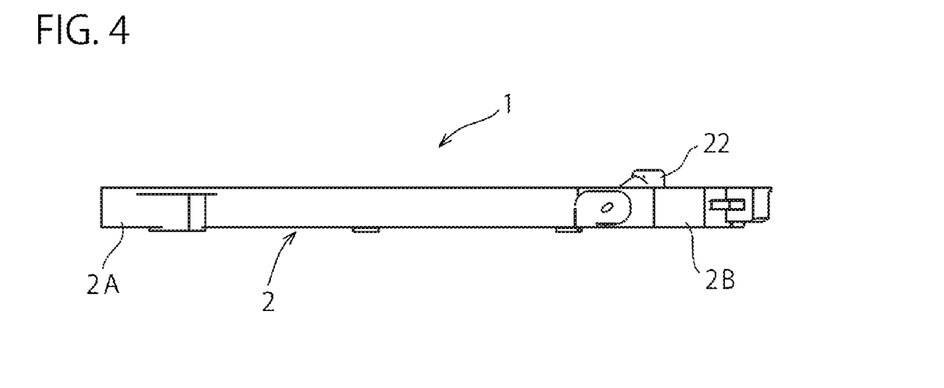
FIG. 4 it is a schematic bottom view of the oil jet arm (FIG. 1).
Figure 5:
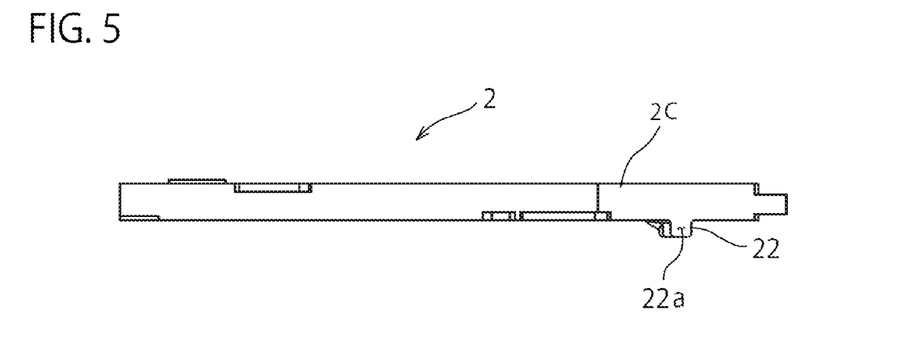
FIG. 5 is a schematic plan view of an arm main body of the oil jet arm (FIG. 1).
Figure 6:
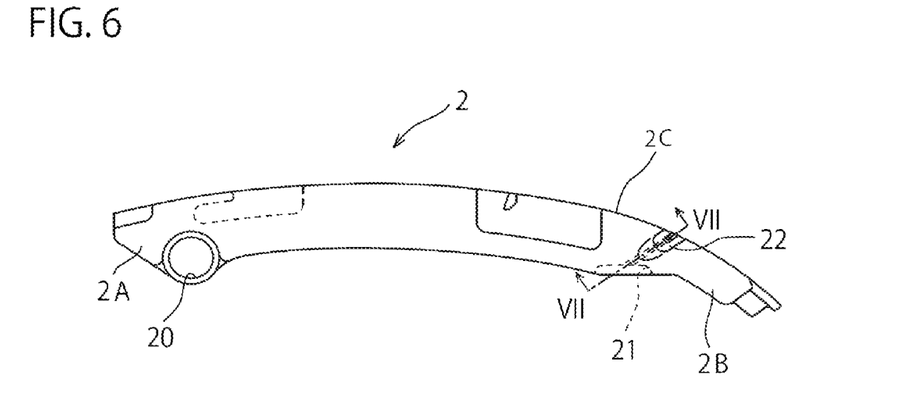
FIG. 6 is a schematic front view of the arm main body of the oil jet arm (FIG. 1).
Figure 7:
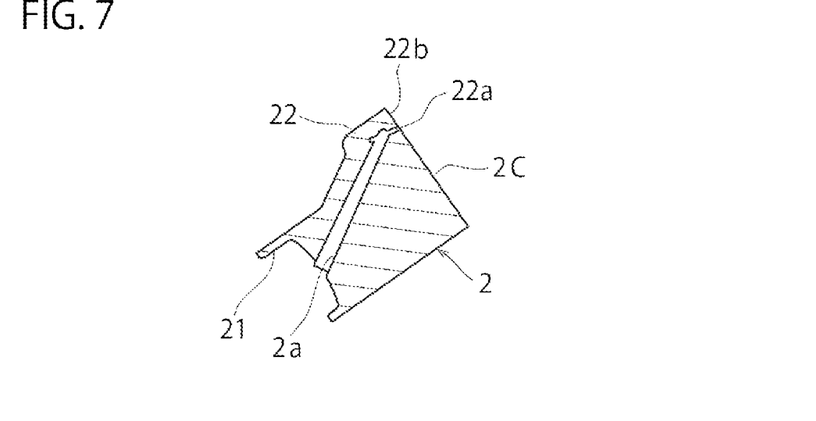
FIG. 7 is a view in cross section along the line VII-VII in FIG. 6.

As shown in FIG. 1-3, the shoe 3 of the oil jet arm 1 comprises a chain sliding surface 30 on which the chain C slides during travel, and upright wall sections 31 for guiding the travelling chain C from both sides are formed on both sides of the chain sliding surface 30.

The arm main body 2 of the oil jet arm 1 comprises a boss hole 20 on the pivoting-side part 2A and comprises a recess 21 on the tip-end side part 2B, as shown in FIG. 2-6. The pivot member 25 (FIG. 1) is inserted into the boss hole 20 and a tip-end portion of the piston 41 (FIG. 1) of the hydraulic tensioner 40 is accommodated in the recess 21.

An oil path 2a communicating with the recess 21 is formed inside the tip-end side part 2B of the main body 2. Furthermore, an overhang part 22 which overhangs one side surface of the tip-end side part 2B and stands upright on a shoe attachment surface 2C of the main body 2 is provided on said side surface. The oil path 2a extends into the overhang part 22 and an oil ejection hole 22a communicating with the oil path 2a is formed opening in the overhang part 22 (see FIG. 7). In the example shown in the figures, a surface 22b of the overhang part 22 in which the oil ejection hole 22a opens is formed essentially flush with the shoe attachment surface 2C of the arm main body 2.

The action and effect of this exemplary embodiment will be described next.

During operation, hydraulic pressure from an oil pump (not depicted) is supplied to a chamber 40a inside the hydraulic tensioner 4 and a pressing force from the piston 41 acts on the tip-end side part 2B of the main body 2 of the oil jet arm 1 (see FIG. 1).

Furthermore, at this point some of the oil supplied into the chamber 40a from the oil pump is discharged from the oil discharge hole 41a in the piston 41. The oil discharged from the oil discharge hole 41a is introduced into the oil path 2a inside the main body 2 and moves through the oil path 2a as far as the overhang part 22, while also being ejected to the outside from the oil ejection hole 22a in the overhang part 22 (see FIGS. 1, 3 and 7).

The oil ejected from the oil ejection hole 22a is supplied to a portion E on the meshing start side with the sprocket 100 on the tension-side span of the chain C (see FIG. 1). As a result, lubricating oil can be supplied to the portion E on the meshing start side of the chain C and it is possible to suppress wear and deterioration of the tension-side span of the chain C and the sprocket 100.

In the exemplary embodiment described above, there is no need to provide a separate member on the cylinder block side in order to eject oil toward the tension-side span of the chain C and there is no need to provide a hole in the member or to machine a female thread, so the cost can be reduced. Furthermore, there is no need for a separate member to be provided protruding into a region between the chain slack-side span and tension-side span, so there is no impediment in terms of the degree of freedom of chain layout design. In addition, when oil is ejected, it is only oil supplied from the oil pump to the hydraulic tensioner 4 which is utilized, so the size of the oil pump can be reduced.

Second Exemplary Embodiment

Figure 8:
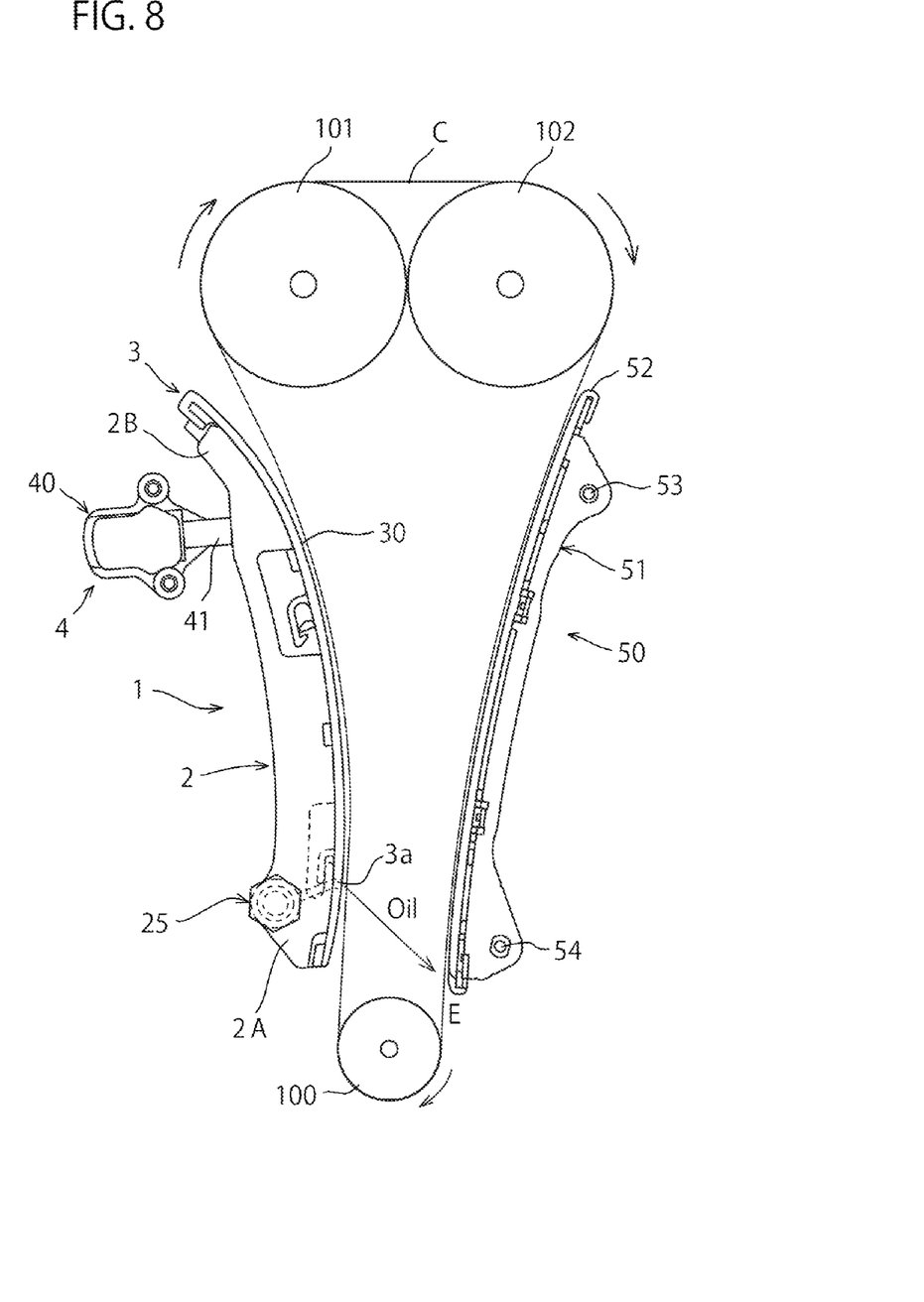
FIG. 8 is a schematic structural diagram of a timing chain system provided with an oil jet arm according to a second exemplary embodiment of the present invention.
Figure 9:
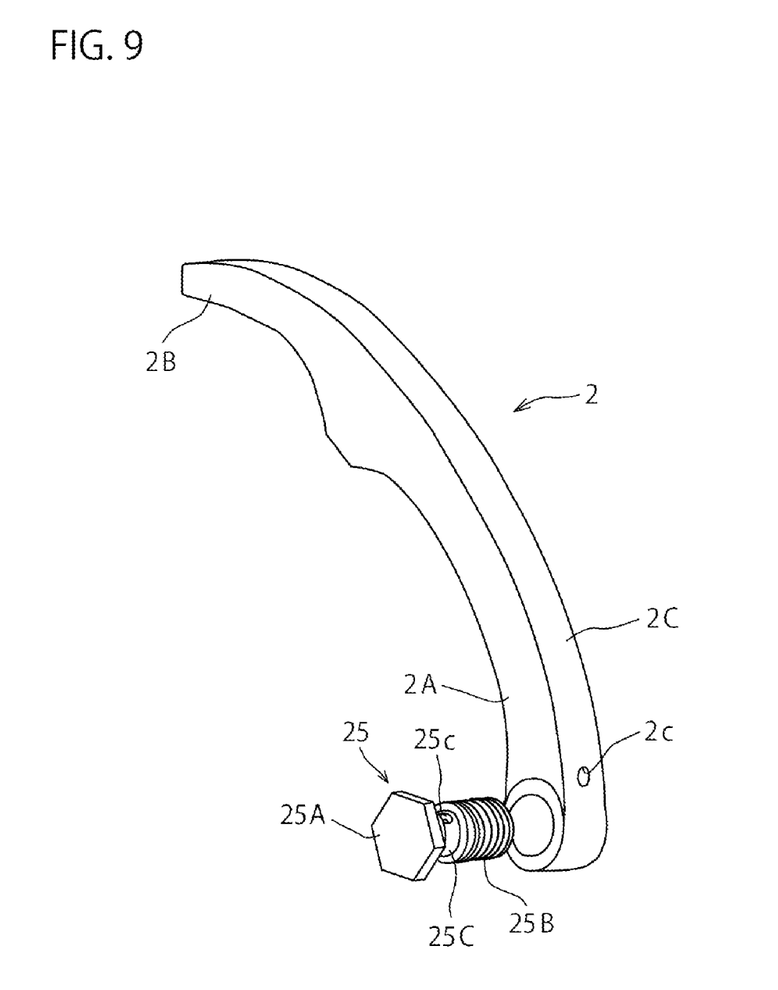
FIG. 9 is an oblique view of the front surface side of the arm main body of the oil jet arm (FIG. 8).
Figure 10:
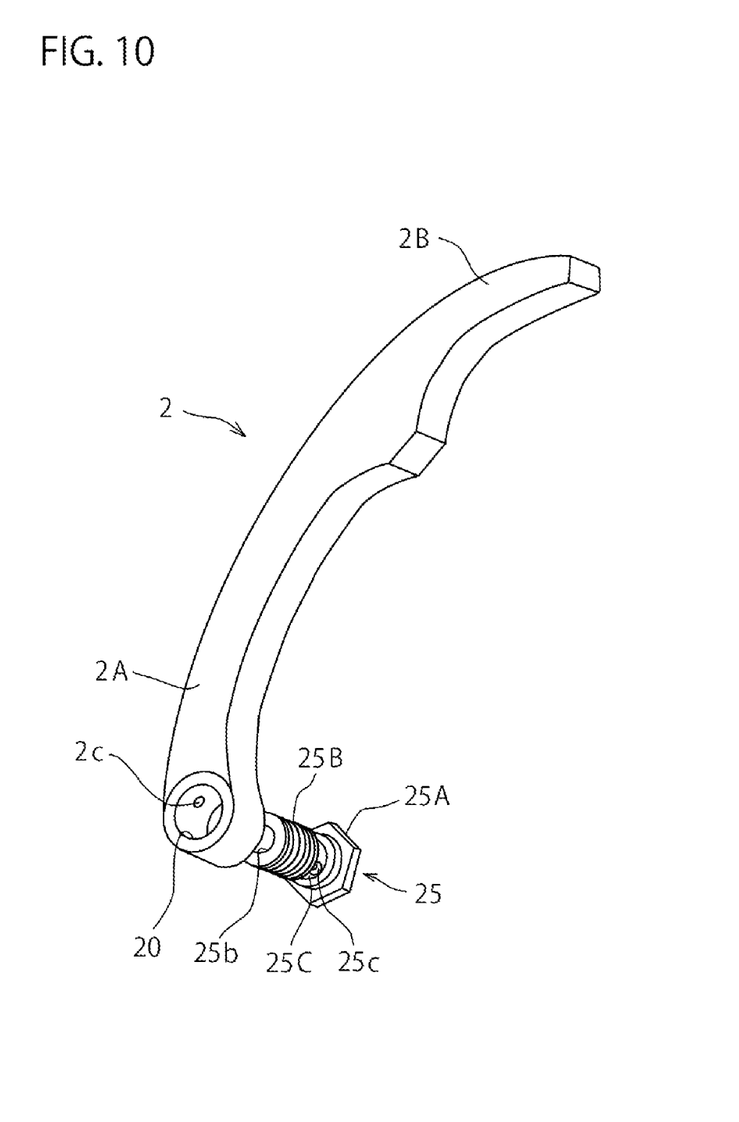
FIG. 10 is an oblique view of the back surface side of the arm main body of the oil jet arm (FIG. 8).

FIG. 8-10 are diagrams to illustrate an oil jet arm according to a second exemplary embodiment of the present invention. In these figures, reference symbols which are the same as in the first exemplary embodiment denote components which are the same or corresponding.

According to the second exemplary embodiment, the arrangement of the oil jet arm 1 is vertically opposite to that shown in the previous exemplary embodiment (see FIG. 8). That is to say, the pivoting-side part 2A of the oil jet arm 1 is disposed toward the bottom (i.e. the crank sprocket 100 side) while the tip-end side part 2B is disposed toward the top (i.e. the cam sprocket 101 side).

Furthermore, the construction of the arm main body 2 and shoe 3 of the oil jet 1 are different to that given in the previous exemplary embodiment. As shown in FIGS. 9 and 10, the oil ejection hole 2c is formed in the shoe attachment surface 2C on the pivoting-side part 2A of the arm main body 2. The oil ejection hole 2c runs through the inside of the arm main body 2 as far as the inner peripheral surface of the boss hole 20.

The pivot member 25 which is inserted into the boss hole 20 in the main body 2 comprises: a head section 25A, a threaded section 25B which is formed at the tip-end side of a shaft part thereof and is fixedly screwed to the cylinder block side; and a small-diameter section 25C which is disposed between the head section 25A and the threaded section 25B. A blind hole 25b extending in the axial direction is formed in the shaft part of the pivot member 25, and a radial hole 25c communicating with the blind hole 25b is formed running through the small-diameter section 25C. Furthermore, oil from the oil pump is supplied to the blind hole 25b although this is not shown in the figures.

An oil ejection hole 3a running through the shoe 3 in the thickness direction is formed at a position in said shoe 3 opposite the oil ejection hole 2c in the arm main body 2 (see FIG. 8).

During operation, hydraulic pressure from the oil pump is supplied to the chamber inside the hydraulic tensioner 4 in the same way as in the first exemplary embodiment described above, and a pressing force from the piston 41 acts on the tip-end side part 2B of the arm main body 2 of the oil jet 1 (see FIG. 8).

At this point, some of the oil supplied into the chamber from the oil pump is discharged from the oil discharge hole in the piston 41, but in the second exemplary embodiment, the discharge oil from the piston 41 is not used to lubricate the tension-side span of the chain C, rather it is discharged downward and collected in an oil pan.

Meanwhile, the oil supplied from the oil pump to the blind hole 25b in the pivot member 25 passes through the radial hole 25c and flows into the annular gap between the small-diameter section 25C and the boss hole 20, and also passes through the oil ejection hole 2c in the arm main body 2 and is ejected to the outside from the oil ejection hole 3a in the shoe 3 (see FIG. 8-10).

The oil ejected from the oil ejection hole 3a is supplied to the portion E on the meshing start side with the sprocket 100 on the tension-side span of the chain C (see FIG. 8). As a result, lubricating oil can be supplied to the portion E on the meshing start side of the chain C and it is possible to suppress wear and deterioration of the tension-side span of the chain C and the sprocket 100.

According to the second exemplary embodiment described above, there is no need to provide a separate member on the cylinder block side in order to eject oil toward the tension-side span of the chain C and there is no need to provide a hole in the member or to machine a female thread, so the cost can be reduced. Furthermore, there is no need for a separate member to be provided protruding into a region between the chain slack-side span and tension-side span, so there is no impediment in terms of the degree of freedom of chain layout design.

The present invention has been described above in terms of preferred exemplary embodiments, but application of the present invention is not limited thereby and the present invention also includes a number of variant examples. Several variant examples are given by way of example below.

First Variant Example

The first and second exemplary embodiments relate to an example in which the oil jet arm 1 comprises the metal arm main body 2 and the shoe 3 detachably fitted thereto, but the oil jet arm according to the present invention may comprise an arm main body made of resin. In this case, there is no need to provide a shoe as a separate member and part of the arm main body forms the chain sliding surface, but a reinforcing member such as a metal plate is preferably provided inside the main body from the point of view of reinforcing the arm main body which is made of resin.

Second Variant Example

The first exemplary embodiment relates to an example in which the overhang part 22 is provided on the side surface of the main body 2 and the oil ejection hole 22a is formed in said overhang part 22, but the location where the oil ejection hole 22a is formed is not limited to the overhang part 22.

For example, it is equally feasible to adopt an arrangement in which a projection which is thinner than the overhang part 22 is provided on the side surface of the arm main body 2 and the projection is raised along the upright wall section 31 of the shoe 3 in order to form an oil groove on the inside surface of the raised part, while an oil groove is also formed at a position corresponding to the oil groove of the raised part of the projection on the outside surface of the upright wall section 31 of the shoe 3. In this case, the oil ejection hole is formed by means of the oil groove formed on the inside surface of the raised part of the projection and the oil groove formed on the outside surface of the upright wall sections 31 of the shoe 3.

Alternatively, it is equally feasible to adopt an arrangement in which the upright wall sections 31 of the shoe 3 are thickened, and an oil ejection hole is formed in said thickened portion with an oil path passing therethrough, while an oil path communicating with the abovementioned oil path is also formed inside the arm main body 2.

Third Variant Example

The second exemplary embodiment described above relates to an example in which oil is introduced from the pivot member 25 to the pivoting-side part 2A of the oil jet arm 1, but the oil introduced to the pivot-side part 2A may equally be supplied from the piston 41 of the hydraulic tensioner 40. In this case, an oil path in the arm longitudinal direction communicating with the hole 41a at the tip end of the piston 41 and communicating with the oil ejection hole 2c in the arm main body 2 is formed inside the main body 2, and the oil supplied from the hydraulic tensioner 40 is fed to the pivoting-side part 2A of the arm main body 2 through said oil path, and is ejected to the outside from the oil ejection hole 2c.

Other Example of Application

The first and second exemplary embodiments relate to an example in which the present invention is applied to an engine timing system, but the present invention may likewise also be applied to other chain tensioning devices (e.g. an engine auxiliary drive chain).

INDUSTRIAL APPLICABILITY

The present invention is of use for a tension arm and in particular is applicable when there is a need to reduce costs and also to reduce the size of an oil pump without impeding the degree of freedom in chain layout.

KEY TO SYMBOLS

1: Oil jet arm (tension arm)
2: Main body
22a, 2c: Oil ejection hole
2A: Pivoting-side part
2B: Tip-end side part
4: Hydraulic tensioner
41: Piston
41a: Hole (oil discharge hole)
100: Sprocket
C: Timing chain (chain)
E: Portion on meshing start side

PRIOR ART DOCUMENTS

Patent Documents

[Patent Document 1] JP 2004-116510 A (see paragraph [0002] and FIG. 1)

The invention claimed is:

1. An oil jet arm for supplying lubricating oil to a tension-side span of a chain while causing a tensioning force to act on a slack-side span of the chain,
said oil jet arm being provided with a pivoting-side part, and a tip-end side part which is provided in such a way as to be pivotable about the pivoting-side part and is acted on by a pressing force from a piston of a hydraulic tensioner, and
said oil jet arm comprises an oil ejection hole for ejecting to the outside oil introduced from the piston or from the pivoting-side part, wherein the oil ejection hole is provided in such a way as to directly supply the lubricating oil to the tension-side span of the chain.

2. The oil jet arm as claimed in claim 1, wherein the oil which is ejected from the oil ejection hole is supplied to a portion on a meshing start side with a sprocket on the chain tension-side span.

3. The oil jet arm as claimed in claim 1, wherein the oil ejection hole is provided in the tip-end side part or in the pivoting-side part.

4. The oil jet arm as claimed in claim 1, wherein the oil ejection hole is provided in the pivoting-side part, and an oil path for feeding, to the pivoting-side part, oil introduced from the piston to the tip-end side part is formed.

5. A method for lubricating a chain span employing the oil jet arm as claimed in claim 1.

6. The oil jet arm as claimed in claim 1, wherein an oil discharge hole for allowing leakage of oil is formed at the tip end of said piston of said hydraulic tensioner and wherein said oil ejection hole is for ejecting oil discharged from the oil discharge hole of the piston.

7. A chain tensioning device provided with:
   a tensioner arm which is disposed on a chain slack-side span; and
   a hydraulic tensioner comprising a piston for causing a pressing force to act on the tensioner arm,
   wherein an oil discharge hole for discharging to the outside oil supplied to the hydraulic tensioner is formed at the tip end of the piston of the hydraulic tensioner, and
   an oil ejection hole for ejecting oil discharged from the oil discharge hole of the piston toward a chain tension-side span is formed in the tensioner arm, wherein the oil ejection hole is provided in such a way as to directly supply the lubricating oil to the chain tension-side span.

8. The chain tensioning device as claimed in claim 7, wherein the oil ejected from the oil ejection hole is supplied to a portion on a meshing start side with a sprocket on the chain tension-side span.

9. The chain tensioning device as claimed in claim 7, wherein the tensioner arm comprises a pivoting-side part and a tip-end side part which is pivotable about the pivoting-side part, and the oil ejection hole is provided in the tip-end side part.

10. The chain tensioning device as claimed in claim 7, wherein the tensioner arm comprises a pivoting-side part and a tip-end side part which is pivotable about the pivoting-side part, the oil ejection hole is provided in the pivoting-side part, and an oil path for feeding, to the pivoting-side part, oil introduced from the oil discharge hole in the piston to the tip-end side part is formed.

11. A method for lubricating a chain span employing the chain tensioning device as claimed in claim 7.

* * * * *